United States Patent [19]
Shinjo

[11] Patent Number: 5,657,536
[45] Date of Patent: Aug. 19, 1997

[54] APPARATUS FOR ATTACHING SELF-PIERCING NUTS TO A PANEL

[75] Inventor: Hiroshi Shinjo, Osaka, Japan

[73] Assignee: Yugenkaisha Shinjo Seisakusho, Osaka, Japan

[21] Appl. No.: 523,524

[22] Filed: Sep. 1, 1995

[30] Foreign Application Priority Data

Sep. 12, 1994 [JP] Japan .................................. 6-244640

[51] Int. Cl.⁶ ................................................ B23P 19/00
[52] U.S. Cl. .................................... 29/798; 29/818
[58] Field of Search ............................. 29/798, 818, 809, 29/243.5; 227/120, 130, 147

[56] References Cited

U.S. PATENT DOCUMENTS

| 3,108,368 | 10/1963 | Steward | 29/798 |
| 3,718,965 | 3/1973 | Steward | 29/798 |
| 4,164,072 | 8/1979 | Shinjo | 29/798 |
| 4,242,793 | 1/1981 | Matthews et al. | 29/798 |
| 4,384,667 | 5/1983 | Smallegan et al. | 29/798 |
| 4,700,470 | 10/1987 | Muller | 29/798 |
| 4,785,529 | 11/1988 | Pamer et al. | 29/798 |
| 5,522,129 | 6/1996 | Shinjo | 29/798 |

FOREIGN PATENT DOCUMENTS 63-20512  7/1988  Japan .

*Primary Examiner*—David P. Bryant
*Attorney, Agent, or Firm*—Antonelli, Terry, Stout & Kraus, LLP.

[57] ABSTRACT

An apparatus has a punch (3) for striking the self-piercing nut 'N' to one side of a metal panel 'W', a piercing-caulking die (5) facing the punch and located on the other side of the panel, and a nut holder (4) having formed in it a guide passage (10) slidable relative to and fitting on the punch. The nut holder further has a nut-feeding aperture (11) opened perpendicular to the passage (10), and the punch (3) is connected by a back plate (7) to a base (8), with the die (5) being driven towards and away from the punch. A cylinder (20) fixed on the back plate drives the nut holder (4) fore and aft along the punch, so that the nut is fed through the aperture (11) into an area located near and ahead of the punch's end when the nut holder is retracted. The punch's end will be located in flush with or slightly protruding ahead of the passage's end opening when the holder is extended. The apparatus is installable in a press of a small shut height and can attach the nuts to an inner side of any metal plate of a shape such as a reversed-U or -L or hat-shape.

4 Claims, 4 Drawing Sheets

FIG. I

APPARATUS FOR ATTACHING SELF-PIERCING NUTS TO A PANEL

BACKGROUND OF THE INVENTION

1. Field of the Invention

The present invention relates to an apparatus for attaching the self-piercing nuts to one side of a panel (viz. metal plate), wherein each nut driven by a punch has an end face to cooperate with a piercing-caulking die located on the other side of the panel and in alignment with the nut, such that the end face is forced to bite the panel to form therein a hole, whose brim is simultaneously caulked to plastically deform and become integral with the nut.

2. Prior Art

The self-piercing nuts capable of being secured to a metal plate when or during the latter is pressed have been and are used more and more in the mass production of metal plate products as in the automobile industry.

Each of the apparatuses for attaching to a panel the self-piercing nuts usually comprises a punch located on one side of the panel and striking the nuts towards the panel. Each apparatus comprises also a piercing-caulking die facing the punch and located on the other side of the panel. Such an apparatus further comprises a guide member through which the punch slidably reciprocates, and a nut holder having a path extending perpendicular to the guide member and terminating as an end aperture so as to feed the nuts. In many cases, those apparatuses are incorporated in a pressing machine together with other pressing dies or tools. The nuts are not necessarily fixed only to a plane portion of a metal panel, but often fixed to bottoms defining the bent or drawn portions of an L-shape or U-shape.

Typically, the prior art apparatuses for fixing the self-piercing nuts onto a metallic panel are constructed in such a manner as disclosed for example in the Japanese Utility Model Publication No. 63-20512. This apparatus comprises a nut holder capable of sliding along and relative to a punch for striking each nut. The nut holder has a guide post secured thereto and extending in parallel with the punch. A spring disposed in the guide post always urges the nut holder towards its normal position. The guide post is designed so long as to protect the nut from jamming while sliding along the punch. In consequence, a portion (hereinafter referred to as 'punch block') consisting of the punch and the nut holder in the apparatus must be of such an increased overall height of length that the apparatus is difficult to be installed in a pressing machine having a small 'shut height'.

The punch block has to be placed in a hollow space of the metal plate (hereinafter referred to as 'workpiece') that has been pressed into a reversed-L, reversed-U or hat shape. Correspondingly, the piercing-caulking die is located outside the workpiece. However, it is difficult for the prior art punch block to take its operable position in such a narrow space, due to such a large axial dimension. Thus, it has scarcely been possible to secure the self-piercing nuts to an upright wall of the hollow space.

SUMMARY OF THE INVENTION

An object of the present invention is therefore to resolve those drawbacks inherent in the prior art apparatuses, and more particularly to provide a novel apparatus having a punch block whose length or height in its axial direction is reduced to such an extent as to be installed in any pressing machine of a small shut height, thereby allowing the end face of each self-piercing nut to be secured to an inner vertical wall that defines a narrow space of a U- or the like shape formed in a metallic panel.

To achieve this object, an apparatus provided herein to attach the self-piercing nuts to a metal panel comprises a punch located on one side of the panel and capable of striking the nuts towards the panel, a piercing-caulking die facing the punch and located on the other side of the panel, a nut holder having a guide passage formed therein to allow the punch to slidably reciprocate, the nut holder further having a feed path extending perpendicular to the guide passage and terminating as a nut-feeding end aperture, a back plate connected to and supporting a rear end of the punch, a double-acting pneumatic cylinder secured to the back plate and having a piston rod extending in parallel with the punch, and the nut holder being operatively connected to the piston rod so as to be driven fore and aft along the punch, so that the nuts are supplied through the end aperture into a delivery area located near and ahead a frontal end of the punch when the nut holder is at its extended position, wherein the frontal end of the punch is located in flush with or slightly protrudes ahead an end opening of the guide passage so that the feed path is closed with the punch when the nut holder is at its retracted position.

In operation, the pneumatic cylinder will drive the nut holder forward and towards its extended position so that a leading one of the nuts is supplied through the feed path and end aperture thereof and into the delivery area. Then, the punch and the piercing-caulking die will be driven towards each other until the die comes into contact with a desired portion of the panel, before striking the nut at its rear face with the punch so that the nut's front face bites and pierces the desired portion. Simultaneously with the punching of the panel to form a hole at that portion, the die will caulk the hole's brim to deform and become integral with the self-piercing nut. Subsequently, the cylinder will pull the nut holder back to its retracted position away from the nut thus secured to the panel. The die will also be retracted at the same time so that the panel having the nut secured thereto is freed to undergo the next manufacture process. The retracted nut holder keeps the end aperture closed with the punch not to feed the succeeding nut, until opened again to feed it when the nut holder advances forward again in the next cycle.

DETAILED DESCRIPTION OF THE PREFERRED EMBODIMENTS

Figure 1:
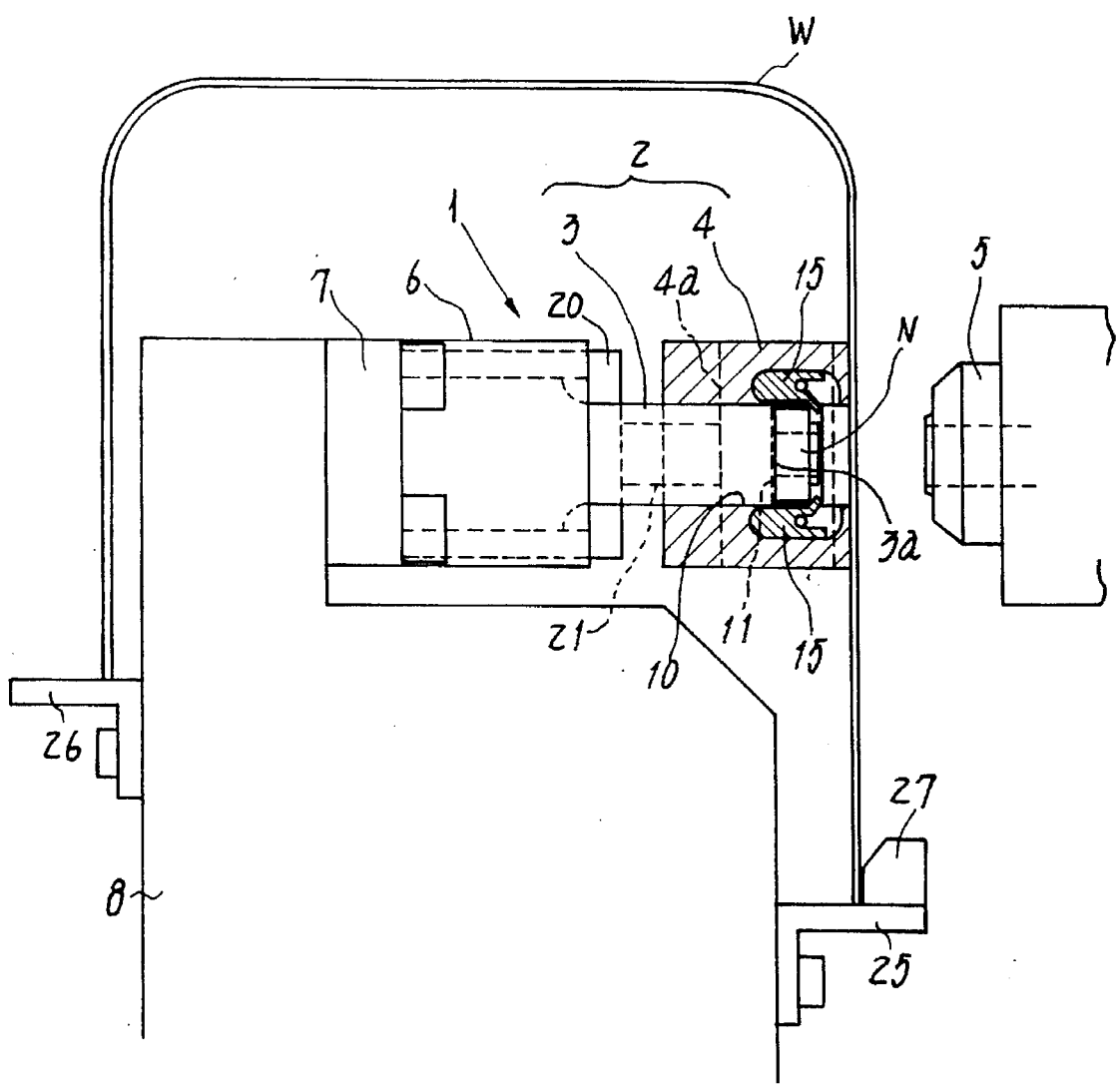
FIG. 1 is a front elevation of an apparatus for attaching the self-piercing nut to a panel, the apparatus being provided by the invention and shown partly in cross section.

Now, some embodiments of the present invention will be described referring to the drawings.

Figure 2:
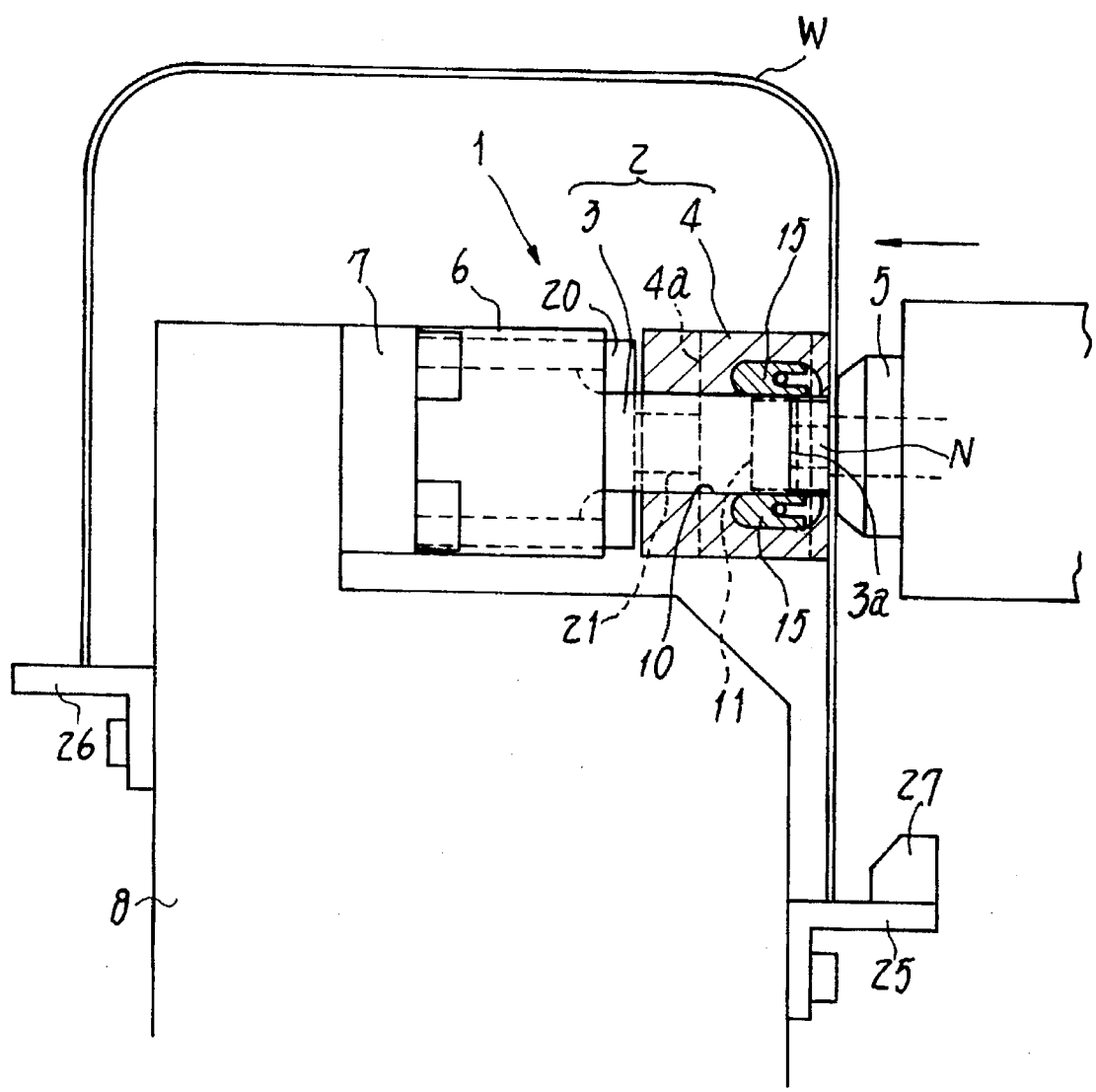
FIG. 2 is also a front elevation of the apparatus shown in a state that one nut has just been struck to and pierced the panel.
Figure 3:
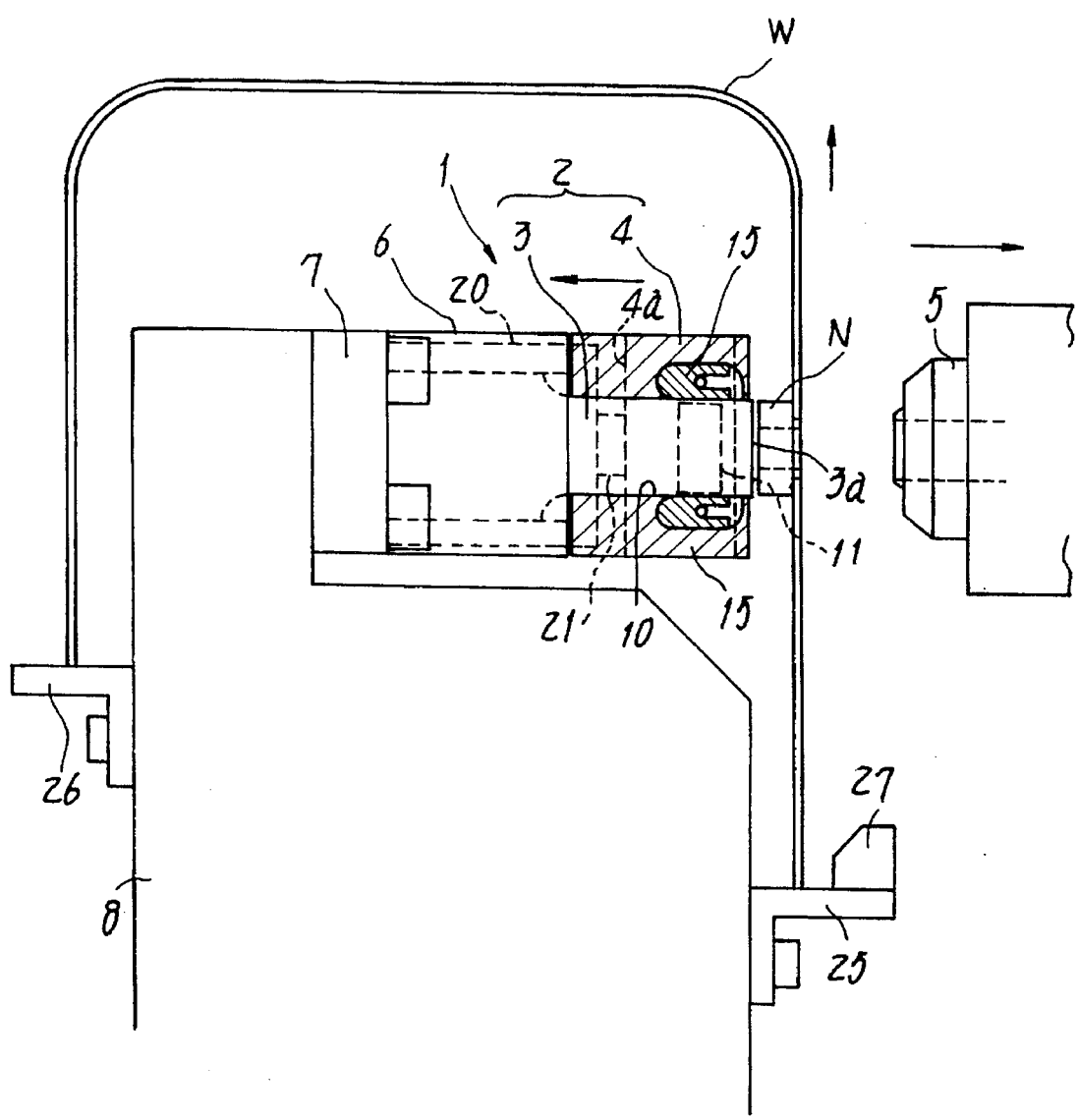
FIG. 3 is a front elevation of the apparatus in a state that the nut has just been fixedly attached to the panel.

FIG. 1 shows an apparatus provided herein for attaching the self-piercing nuts in the horizontal direction to a metal panel, viz. a workpiece 'W' that has been bent into a reversed-U shape. FIGS. 2 and 3 illustrate in sequential order the operation of the apparatus shown in FIG. 1. As seen in these drawing figures, an operative portion referred to as a punch block comprises a striking punch 3 and a nut holder 4, and can be located inside the workpiece 'W'. Correspondingly, a piercing-caulking die 5 is to be located outside the workpiece.

The striking punch 3 is rigidly connected by a punch holder 6 to a back plate 7. This back plate 7, contacting and supporting the basal end of the punch 3, is fixed on a base 8 such that the punch protruding sideways has its axis extending in a horizontal direction.

The piercing-caulking die 5 disposed outside the workpiece 'W' also lies horizontally to face the striking punch 3. This die 5 has its axis in alignment with that of said punch. A cam slide of a pressing machine not shown will drive the die 5 to reciprocate along its axis towards and away from the punch 3.

Figure 4:
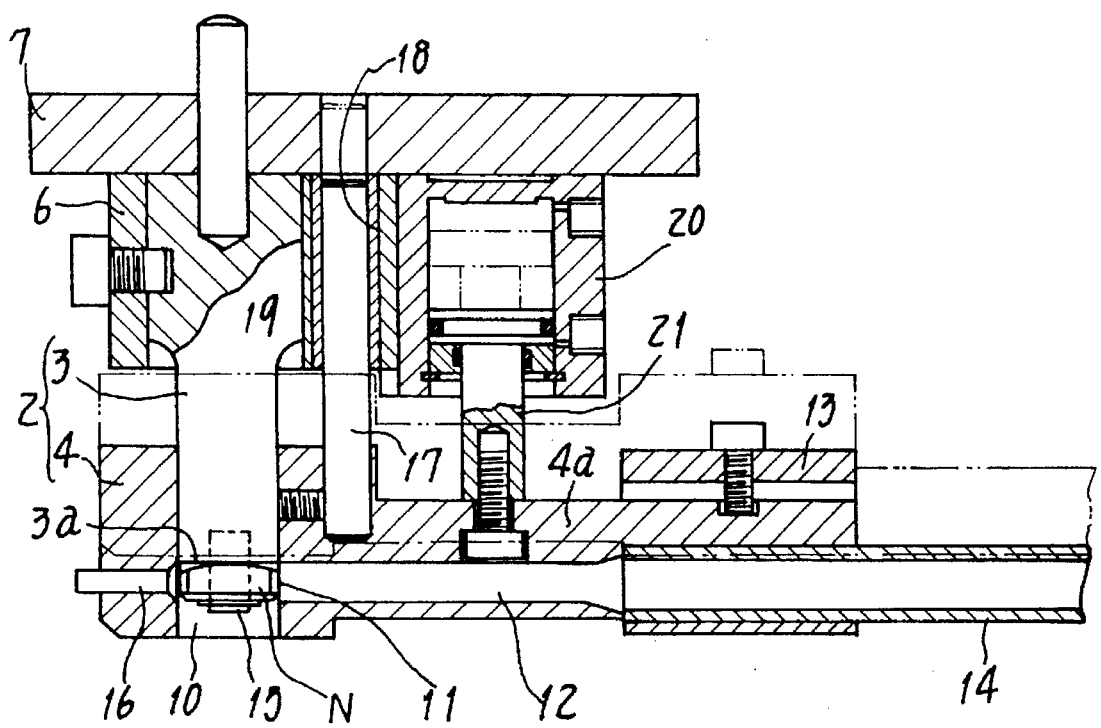
FIG. 4 is a vertical cross section of a punch block incorporated in the apparatus and consisting of a punch and a nut holder.
Figure 5:
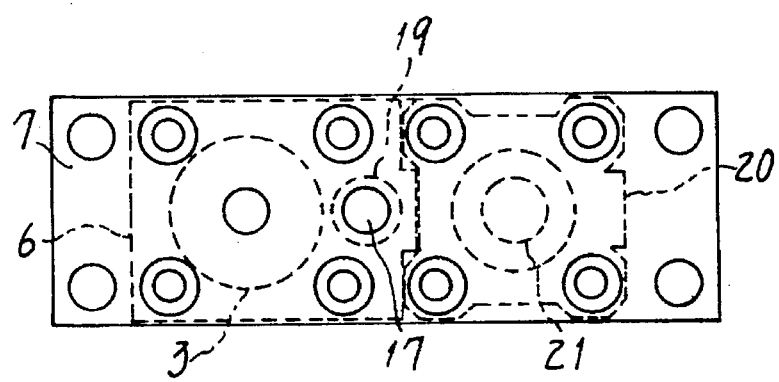
FIG. 5 is a plan view of the punch block.

As is best seen in FIG. 4, the nut holder 4 has a guide passage 10 formed therein to receive and permit the striking punch 3 to slide fore and aft. The nut holder 4 further has a feed path 12 extending perpendicular to the guide passage 10. This feed path formed through a chute portion 4a of the nut holder has a nut-feeding end aperture 11 opened into and communicating with the guide passage. A chute hose 14 is attached by a joint 13 to the rear end of the chute portion 4a, so that the self-piercing nuts 'N' supplied through the hose 14 can advance through the feed path 12 and the end aperture 11 into a delivery area. This area defined in the guide passage 10 is located near and in front of the distal (viz. frontal) free end 3a of the punch 3. A pair of fingers 15 are provided in the nut holder 4 so as to temporarily hold the nut 'N' in place within the guide passage 10. The nut holder further has a sensor 16 to detect the nut 'N' having entered the delivery area.

Since the striking punch 3 is fixed to the base 8, the nut holder 4 has to reciprocate along, relative to and axially of the punch. In order to smoothen such a reciprocation, a guide post 17 fixed on the nut holder extends in parallel with the punch 3. This guide post is slidably inserted in a bearing sleeve 19, which is fitted in a bearing hole 18 formed in the punch holder 6 mentioned above.

A pneumatic cylinder 20 having a basal end secured to the back plate 7 is located adjacent to the punch holder 6. The cylinder 20 of the double-acting type has a piston rod 21 extending in parallel with the punch 3. A distal end of the piston rod 21 is connected to the chute portion 4a of the nut holder 4. Thus, the rod and the holder can move fore and aft in unison with each other, and along the punch 3. When the nut holder 4 is temporarily at its extended position shown by the solid lines in FIG. 4, the nut 'N' can transfer from the end aperture 11 to the delivery area formed in the guide passage 10. If, contrarily, the nut holder 4 is at retracted position shown by the phantom lines in FIG. 4, the frontal end 3a of the punch 3 will stand in flush with or slightly protrude out of an end opening of said passage. The nut holder 4 temporarily held at such a retracted position will stop the nut-feeding end aperture 11 of the feed path 12, so that the succeeding nut 'N' is prevented from unintentionally entering the guide passage 10.

The base 8 has brackets 25 and 26 secured to its front and rear sides, respectively. The brackets will support the workpiece 'W' to which the self-piercing nuts 'N' have to be attached. A stopper 27 protruding from the front bracket 25 serves to hold the workpiece at its correct position.

FIG. 1 shows the described apparatus 1 in its state ready to strike and attach the nut to a panel. The nut holder 4 is urged by the pneumatic cylinder 20 to take its foremost or extended position. The nut 'N' is held in the delivery area within the guide passage 10. Front face of the nut holder 4 is in contact with the inner side of an upright wall of the workpiece 'W' held at its correct position. The piercing-caulking die 5 is at retracted position. Next, the die 5 will be driven towards the workpiece 'W' so as to press it against the punch 3. In consequence, the workpiece and the nut holder 4 will be moved in unison and rearward a small distance along the punch 3, against the pressure imparted thereto by the pneumatic cylinder 20. Thus, the punch 3 will assume a thrust position relative to the nut holder, as if having moved forward a little. As a result, the self-piercing nut 'N' is thrust strongly by the punch 3 to the workpiece 'W' as shown in FIG. 2, so that the front face of the nut pierces a portion of the workpiece. At the same time, the piercing-caulking die 5 will caulk the brim around the thus pierced hole so as to fix the nut on the workpiece. Once the nut is struck and attached to the workpiece, the pneumatic cylinder 20 will retract the nut holder 4 away from the nut 'N' attached to the workpiece 'W', as shown in FIG. 3. On the other hand, the piercing-caulking die 5 is retracted to liberate the workpiece, which will then be lifted and transferred to the next work station.

In the described embodiment, the nut 'N' is struck horizontally to be attached to a vertical wall of workpiece 'W' that is of a reversed-U shape. However, the apparatus provided herein may also be used to strike the nuts upward to be fixed to a lower side of any workpiece's top. The apparatus can be installed in any pressing machine of a small 'shut height'.

In summary, the striking punch is slidably inserted through the nut holder which in turn is driven fore and aft along the punch by the double-acting pneumatic cylinder. Therefore, the punch block consisting of the punch and nut holder in this apparatus can be of such a small dimension in the direction of their axes as to be adapted for installation in any pressing machine of small shut height. The self-piercing nuts can now be attached to an inner side of each workpiece that may be of reversed-U or -L shape or hat-shape or the like. The nut holder at its retracted position stops the nut-feeding aperture so as to surely inhibit the succeeding nuts from entering the delivery area.

What is claimed is:

1. An apparatus for attaching self-piercing nuts to a metal panel, the apparatus comprising:

a punch located on one side of the panel and capable of striking the nuts towards the panel;

a piercing-caulking die facing the punch and located on the other side of the panel;

a nut holder having a guide passage formed therein to allow the punch to slidably reciprocate;

the nut holder further having a feed path extending perpendicular to the guide passage and terminating as a nut-feeding end aperture;

a back plate connected to and supporting a rear end of the punch;

a double-acting pneumatic cylinder secured to the back plate and having a piston rod extending in parallel with the punch and being moveable between an extended position toward and a retracted position away from said piercing-caulking die; and the nut holder being operatively connected to the piston rod so as to be driven therewith between said extended and retracted positions fore and aft along the punch, so that the nuts are supplied through the end aperture into a delivery area located near and ahead of a frontal end of the punch when the nut holder is at said extended position, wherein the frontal end of the punch is located in flush with or slightly protrudes ahead of an end opening of the guide passage so that the feed path is closed with the punch when the nut holder is at said retracted position.

2. An apparatus as defined in claim 1, further comprising a guide post fixed on the nut holder extending in parallel with the punch, wherein the guide post is slidably inserted in a bearing sleeve, which is fitted in a bearing hole formed in the punch holder.

3. An apparatus for attaching self-piercing nuts to a panel, the apparatus comprising:

a punch located on one side of the panel and capable of striking the nuts towards the panel;

a piercing-caulking die facing the punch and located on the other side of the panel;

a nut holder having formed therein a guide passage;

the guide passage having an end opening so as to allow the punch to slidably reciprocate through the guide passage;

the nut holder further having a feed path extending perpendicular to the guide passage and terminating as a nut-feeding end aperture so as to feed the nuts;

the punch being rigidly connected by a back plate to a base;

the piercing-caulking die facing the punch and being driven to move towards and away from the punch;

a double-acting pneumatic cylinder fixed on said back plate and having a piston rod movable between an extended position toward and a retracted position away from said piercing-caulking die; and the piston rod extending in parallel with the punch and operatively connected to the nut holder so as to drive the nut holder therewith fore and aft along the punch between said extended and retracted positions, such that the nuts can be supplied through the end aperture of the feed path into a delivery area located near and ahead of a frontal end of the punch when the nut holder is at said extended position, and the frontal end of the punch is located in flush with or slightly protrudes ahead of the end opening of the guide passage so that the feed path is closed with the punch when the nut holder is at said retracted position, wherein the piercing-caulking die is capable of being driven towards the panel so as to press it against the punch, while moving rearward the panel and the nut holder in unison with each other a small distance so that the nut comes into contact with the panel, with the punch thrusting the nut onto the panel, whereby the nut and the die cooperate with each other to pierce a portion of the panel and simultaneously the die caulks a brim around a hole thus formed through the panel so as to secure the nut thereto, before the pneumatic cylinder retracts the nut holder away from the nut thus attached to the panel.

4. An apparatus as defined in claim 3, wherein the punch and the die facing one another stand substantially horizontally and in alignment with each other.

* * * * *